E. NOEL.
GEAR.
APPLICATION FILED SEPT. 23, 1918.

1,324,063.

Patented Dec. 9, 1919.

WITNESS:

Mildred G. Ellinwood
H. D. Ellinwood

INVENTOR.
Eli Noel.
BY
M. C. Gillham
ATTORNEY.

UNITED STATES PATENT OFFICE.

ELI NOEL, OF KANSAS CITY, MISSOURI.

GEAR.

1,324,063.  Specification of Letters Patent.  Patented Dec. 9, 1919.

Application filed September 23, 1918. Serial No. 255,357.

*To all whom it may concern:*

Be it known that I, ELI NOEL, a citizen of the United States, residing at Kansas City, in the county of Jackson and State of Missouri, have invented a new and useful Gear, of which the following is a specification.

My invention relates to gears which are used in universal joints, and the object of my invention is to provide a gear of peculiar features which is adapted to provide strength and great flexibility in universal joints, when used therein, and to reduce shock and noise thereof to a minimum.

Figure 1:
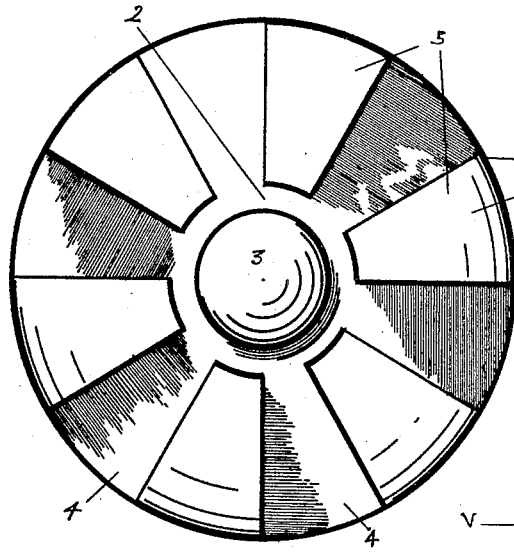
Figure 2:
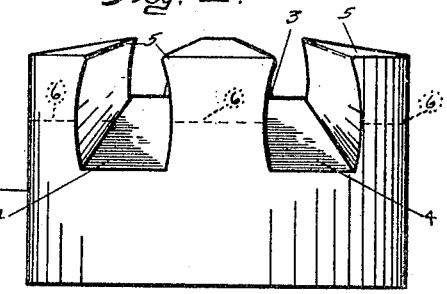
Figure 4:
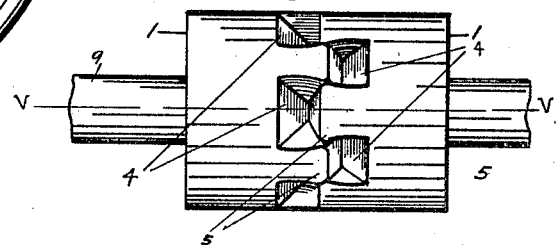
Figure 3:
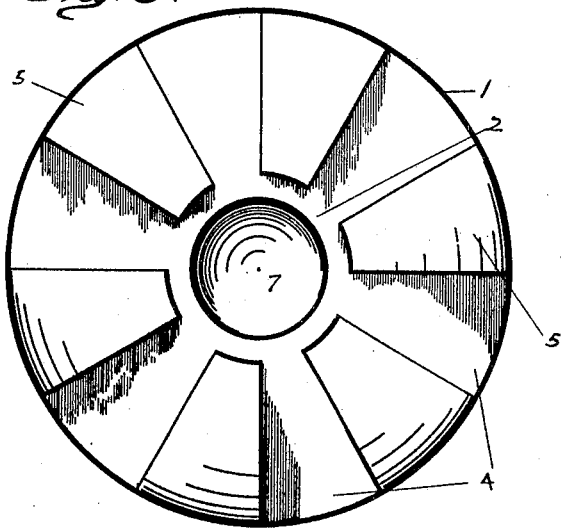
Figure 5:
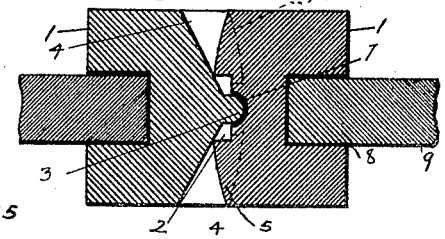

I attain these objects by means of the structure illustrated in the accompanying drawing in which—Figure 1, is a plan view of the gear constructed in accordance with my invention, and showing the spherical center thereon; Fig. 2, is a side elevation of the same; Fig. 3, is a plan view of the same, and showing the concaved center therein; Fig. 4, is a side elevation of a universal joint embodying my invention, and Fig. 5, is a longitudinal section through the universal joint, on the line V—V, in Fig. 4.

Similar numerals of reference refer to corresponding parts throughout the several views.

The gear consists of a wheel 1, having one of its sides convexed upon any suitable radius. The central portion of the convexed side of the wheel, is provided with a sunken or depressed circular portion 2, and a spherical body portion 3, and which is located at the axis of the wheel. Radially extending inclined channels 4, are formed at regular intervals in the convexed side of the wheel and extend from the peripheral edge of the wheel inwardly to and in communication with the depressed portion 2, thereby the residue of the convexed side of the wheel is formed into radially extending convexed teeth or cogs 5. The vertical sides of the cogs 5, are then cut away transversely on inwardly curved lines, on a radius corresponding with the radius of the wheel, which curve is determined by a line protracted circumferentially of the wheel and traversing the outer ends of the cogs 5, at a point thereon, a little distance below the middle thereof; for instance, the height of the cog, at the peripheral edge of the wheel being seven eighths of an inch, the line would traverse the end of the cog at one half inch from its top edge, so that the line would be one eighth more distant from the top of the cog than from the bottom thereof, as is illustrated by the dotted lines shown at 6, in Fig. 2. The radius of the wheel 1, determines the number of cogs 5, to be formed thereon and also determines the radius of the concaved sides thereof, and the line shown at 6, determines the central point from which the contour of the sides of the cogs are described; for instance, a wheel having a diameter of three inches has a radius of one and one half inches; therefore, the center line of the cogs, at the peripheral edge of the wheel are distant one and one half inches from the center of the channels 4, at the same place on the edge of the wheel. The radius of the curved sides of the cogs being identical with the radius of the wheel, the center of the former would lie on the line shown at 6, at a distance of one and one half inches from the curve produced by the radius, or at the edge of the initially vertical corner of the cog next rearward of the cog having the curved contour described by the radius mentioned, and so on around the wheel in both directions. The upper edges of the sides of the cogs, from the upper limit of the inwardly curved sides, are rounded.

The companion wheel 1, shown in Fig. 3, is formed identical with the wheel 1, shown in Fig. 1, excepting that the center is centrally depressed to form a concaved seat 7, which is adapted to receive the spherical protuberance 2, when the pair of wheels are operatively assembled, as and for a universal joint. The reverse side of the gear is provided with a bore 8, adapted to receive a shaft 9.

If a gear embodying the features of my invention and provided with a convexed center is operatively assembled with a similar gear having a concaved center, and each gear is provided with a shaft, the assembled gears form a universal joint with facility for receiving and imparting power at diverse angles. When the gears are in straight alinement, as shown in Fig. 4, the teeth or cogs on the respective gears are in mesh and, because of the convexity thereof, are in contact throughout their length. In this position the spherical portion 3, is seated in the concaved depression 7, and thereby the integrity of the joint is preserved. The peculiar formation of the sides of the cogs is a provision against back lash, shock, and noise, and usually present in ordinary gears used in universal joints, permitting the cogs to have a maximum of positive contact.

Having described my invention what I claim is—

1. A gear for universal joints, consisting of a wheel having a convexed side and provided with radially extending convex cogs having concaved sides with a radius corresponding with the radius of said wheel.

2. A gear for universal joints, consisting of a wheel having a convexed side and provided with radially extending convex cogs having concaved sides with a radius corresponding with the radius of said wheel and with a spherical portion at the inner end of said cogs and located at the axis of the wheel.

3. A gear for universal joints, consisting of a wheel having a convexed side and provided with radially extending convex cogs having concaved sides with a radius corresponding with the radius of said wheel, and a concaved depression at the inner ends of said cogs and located at the axis of the wheel.

Dated September 20th, 1918.

ELI NOEL.

Witnesses:
   BATTLE MCCARDLE,
   F. E. SMALL.